(12) United States Patent
Song

(10) Patent No.: US 11,999,412 B2
(45) Date of Patent: Jun. 4, 2024

(54) SIDE SILL ASSEMBLY OF VEHICLE WITH REINFORCED STIFFNESS

(71) Applicants: Hyundai Motor Company, Seoul (KR); Kia Corporation, Seoul (KR)

(72) Inventor: Won-Jung Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 117 days.

(21) Appl. No.: 17/742,997

(22) Filed: May 12, 2022

(65) Prior Publication Data

US 2023/0072451 A1 Mar. 9, 2023

(30) Foreign Application Priority Data

Sep. 9, 2021 (KR) .......................... 10-2021-0120467

(51) Int. Cl.
*B62D 25/02* (2006.01)
*B62D 21/15* (2006.01)
*B62D 27/02* (2006.01)

(52) U.S. Cl.
CPC ......... *B62D 25/025* (2013.01); *B62D 21/157* (2013.01); *B62D 27/023* (2013.01)

(58) Field of Classification Search
CPC .... B62D 25/025; B62D 21/157; B62D 27/02; B62D 27/023

USPC ................................ 296/209, 187.12, 29, 30
See application file for complete search history.

(56) References Cited

U.S. PATENT DOCUMENTS

| | | | | |
|---|---|---|---|---|
| 3,534,463 A | * | 10/1970 | Molin | B21D 47/00 52/394 |
| 9,725,118 B2 | * | 8/2017 | Alwan | B60K 1/04 |
| 10,370,040 B1 | * | 8/2019 | Cooper | B62D 21/157 |
| 2005/0121926 A1 | * | 6/2005 | Montanvert | B62D 21/157 293/128 |

FOREIGN PATENT DOCUMENTS

KR 20-1997-0051616 9/1997

* cited by examiner

*Primary Examiner* — Dennis H Pedder
(74) *Attorney, Agent, or Firm* — MORGAN, LEWIS & BOCKIUS LLP

(57) ABSTRACT

A side sill assembly of the vehicle includes a side sill inner, a side sill outer, and a reinforcement unit provided between the side sill inner and the side sill outer. The reinforcement unit includes an upper member provided in a longitudinal direction of the vehicle; a lower member provided in the longitudinal direction of the vehicle, and located to be spaced from the upper member under the upper member; and an intermediate member having an upper surface bonded to a bottom portion of the upper member and a lower surface bonded to an upper surface of the lower member alternately formed thereon.

17 Claims, 5 Drawing Sheets

SIDE SILL ASSEMBLY OF VEHICLE WITH REINFORCED STIFFNESS

CROSS-REFERENCE TO RELATED APPLICATION

The present application claims priority to Korean Patent Application No. 10-2021-0120467, filed on Sep. 9, 2021, the entire contents of which is incorporated herein for all purposes by this reference.

BACKGROUND OF THE INVENTION

Field of the Invention

The present invention relates to a side sill assembly configured to support a lower portion of a side surface of a vehicle, and more specifically, to a side sill assembly of a vehicle with reinforced stiffness, which can protect a high-voltage battery mounted therein from impact in the event of a side collision while achieving lightweight.

Description of Related Art

A side sill is provided to exert the stiffness of a lower portion of a side surface of the vehicle.

Meanwhile, an eco-friendly vehicle, such as an electric vehicle or a hybrid electric vehicle, utilizes a lower portion of a center floor panel of a vehicle as a mounting space of a high-voltage battery that supplies power to a driving motor.

The eco-friendly vehicle does not share a platform with an internal combustion engine vehicle, and adopts a platform for only electric vehicle. This is because it is advantageous that a space under the center floor panel is utilized to increase the capacity of the mounted high-voltage battery to increase the mileage of the vehicle.

However, such a structure is exposed to the risk of damage to the high-voltage battery in the event of a side collision of the vehicle. The damage to the high-voltage battery leads to a fire, and fire due to damage to the high-voltage battery is difficult to extinguish unlike a general fire.

Therefore, the side sill may exert sufficient stiffness so that collision energy is not delivered to the high-voltage battery in the event of the side collision.

To the present end, a reinforcing structure is applied to the inside of the side sill including a side sill inner and a side sill outer.

For example, there is a side sill reinforcement structure which is applied to the inside of the side sill by manufacturing a reinforcement member by extruding an aluminum material. Although the aluminum extruded material may be lightweight, the manufacturing cost is high, weakening price competitiveness.

Meanwhile, as shown in FIG. 1, a reinforcement unit 130 of a steel press structure composed of reinforcement members 131 to 134 made of a steel material can further be manufactured and applied to the inside of the side sill. However, this can lower the cost, but there is a problem in that the weight is increased compared to the aluminum extruded material.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side sill assembly of a vehicle with reinforced stiffness, which utilizes an inexpensive material but exerts sufficient stiffness performance even while suppressing the weight to a level of an aluminum material, reducing deformation due to impact in the event of a side collision.

According to a side sill assembly of a vehicle with reinforced stiffness according to various exemplary embodiments of the present invention for achieving the object, in the side sill assembly of the vehicle including: a side sill inner, a side sill outer, and a reinforcement unit provided between the side sill inner and the side sill outer, the reinforcement unit may include an upper member provided in a longitudinal direction of the vehicle; a lower member provided in the longitudinal direction of the vehicle, and located to be spaced from the upper member under the upper member; and an intermediate member having an upper surface bonded to a bottom portion of the upper member and a lower surface bonded to an upper surface of the lower member alternately formed thereon.

The upper and lower surfaces of the intermediate member may be connected by a connection surface.

The upper member may include an upper base formed in the longitudinal direction of the vehicle; and an upper flange portion formed to extend upwards from a width directional inside end portion of the vehicle of the upper base to be bonded to an inside surface of the side sill inner.

An upper reinforcement bead having a convex cross section may be formed on the upper base in the longitudinal direction of the vehicle.

The lower member may include a lower base formed in the longitudinal direction of the vehicle; and a lower flange portion formed to extend downwardly from a width directional inside end portion of the vehicle of the lower base to be bonded to a lower bonding portion of the side sill inner.

A lower reinforcement bead having a concave cross section may be formed on the lower base in the longitudinal direction of the vehicle.

The lower member may be formed so that a width directional width of the vehicle may be narrower than a width of the intermediate member.

The lower member may be formed from a width directional outside end portion of the vehicle of the intermediate member up to a predetermined width.

The width of the lower member may be formed at 45% to 55% of the width of the intermediate member.

The intermediate member may be bonded to the upper member and the lower member by spot welding.

A width directional inside of the vehicle of the lower surface of the intermediate member may become a welding surface bonded to an inclined surface of an inside surface of the side sill inner.

A nut mounting surface on which a lower end portion of a battery mounting nut configured to mount a battery may be located may be formed on the welding surface, and the battery mounting nut may have a lower end portion bonded to the nut mounting surface.

The lower end portion of the battery mounting nut may be bonded to the nut mounting surface by $CO_2$ welding or projection welding.

A through hole through which the battery mounting nut is provided to penetrate may be formed in the upper base of the upper member, and an outside circumference of the battery mounting nut may be bonded to an inside circumference of the through hole.

The outside circumference of the battery mounting nut and the inside circumference of the through hole may be bonded by $CO_2$ welding.

The width of the lower member may be formed from the width directional outside end portion of the vehicle of the lower surface up to a portion where the welding surface is formed.

According to the side sill assembly of the vehicle with reinforced stiffness according to various exemplary embodiments of the present invention having the above configuration, it is possible to use the inexpensive material such as steel but exert stiffness corresponding thereto with the weight of the level equivalent to the expensive aluminum extruded material, implementing the side collision performance and saving the cost.

As described above, it is possible to improve performance against the side collision in the vehicle to which the high-voltage battery is applied, preventing fire caused by damage to the high-voltage battery due to the side collision.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
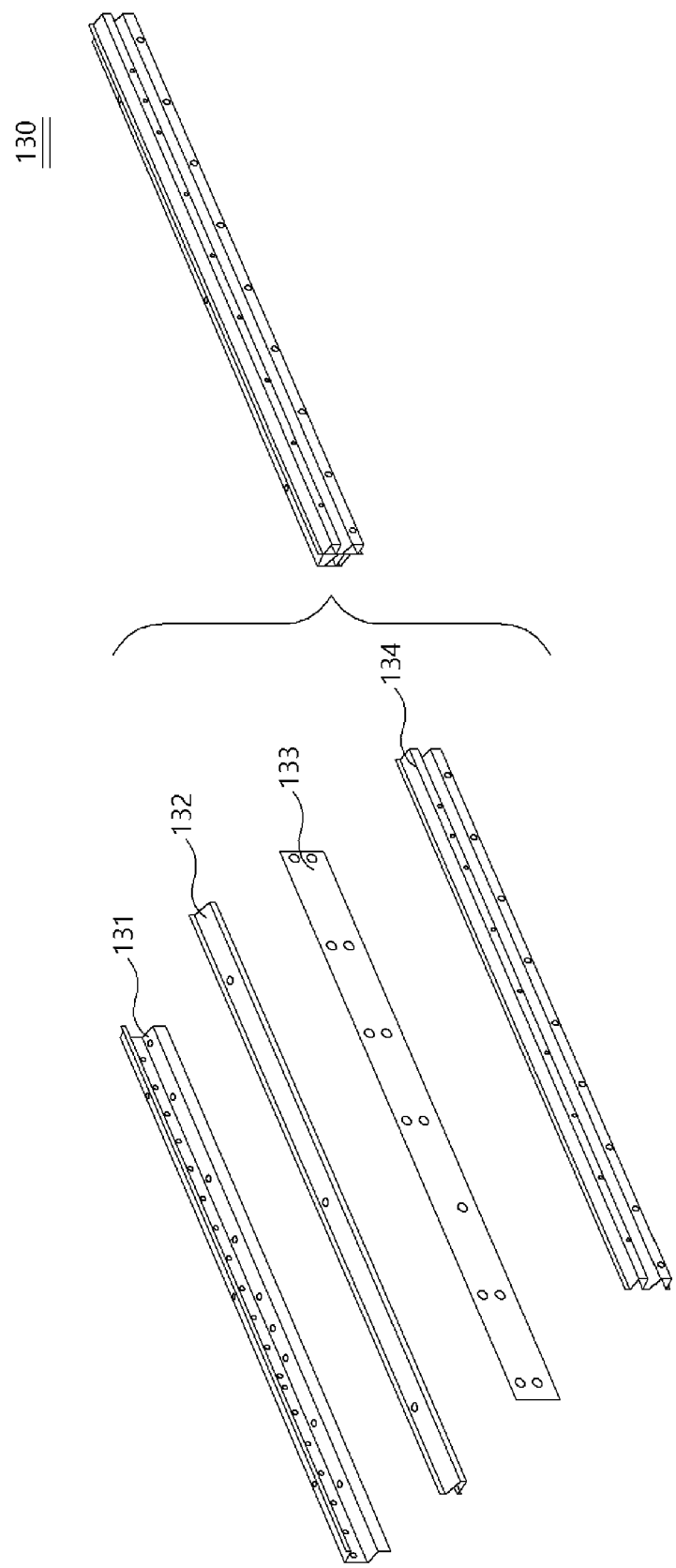
FIG. 1 is an exploded perspective diagram and a perspective diagram showing a side sill reinforcement member of a steel press structure according to the related art.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a side sill assembly of a vehicle with reinforced stiffness according to various exemplary embodiments of the present invention will be described in detail with reference to the accompanying drawings.

Figure 2:
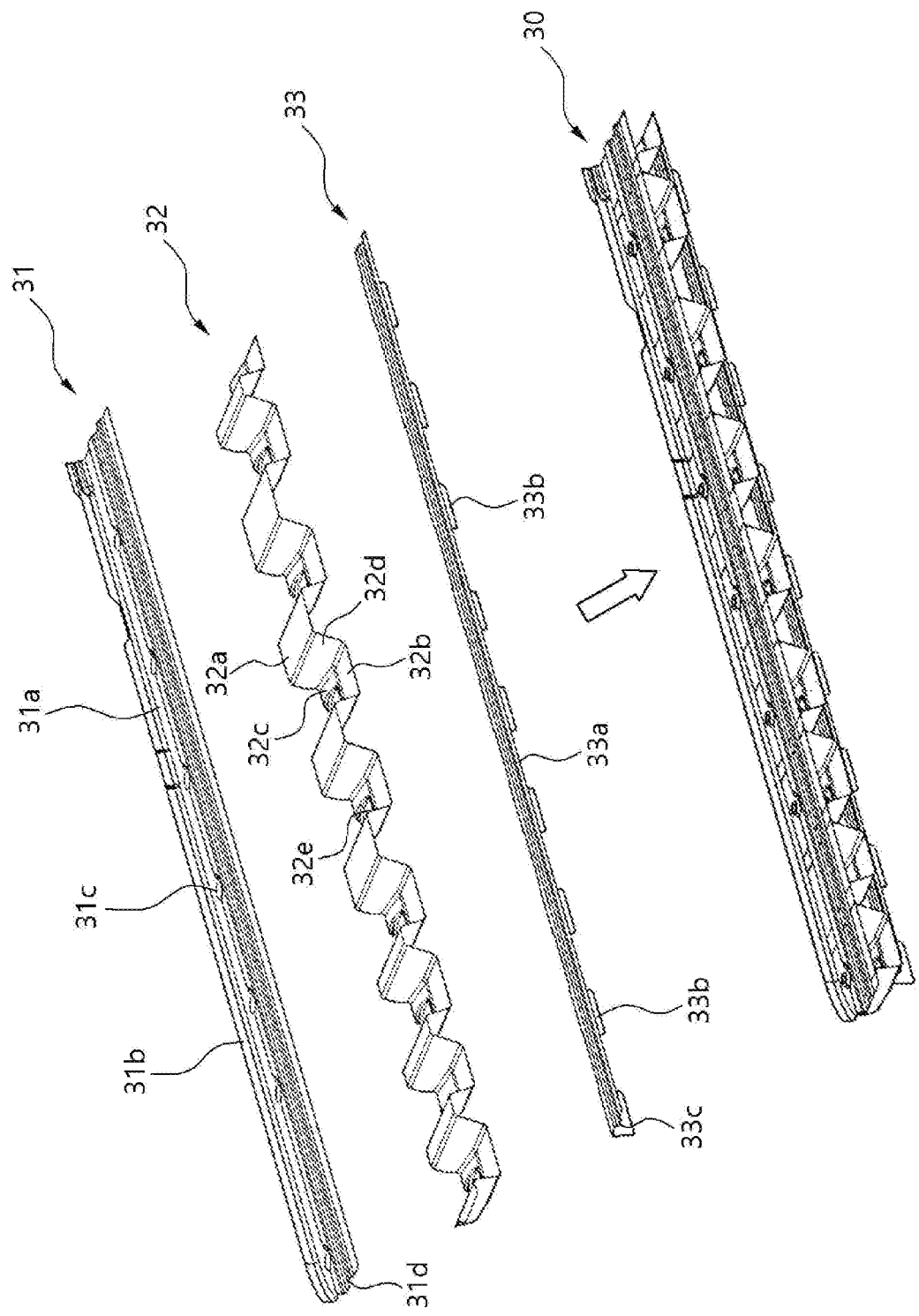
FIG. 2 is an exploded perspective diagram and a perspective diagram of a reinforcement unit in a side sill assembly of a vehicle with reinforced stiffness according to various exemplary embodiments of the present invention.

According to a side sill assembly of a vehicle with reinforced stiffness according to various exemplary embodiments of the present invention, in the side sill assembly of the vehicle including a side sill inner 10, a side sill outer 20, and a reinforcement unit 30 provided between the side sill inner 10 and the side sill outer 20, the reinforcement unit 30 may include an upper member 31 formed in a longitudinal direction of the vehicle, a lower member 33 formed in the longitudinal direction of the vehicle, and located to be spaced from the upper member 31 under the upper member 31, and an intermediate member 32 having an upper surface 32a bonded to the bottom portion of the upper member 31 and a lower surface 32b bonded to an upper surface of the lower member 33 alternately formed thereon as shown in FIG. 2.

A side sill assembly 1 may have the side sill inner 10 and the side sill outer 20 disposed in the longitudinal direction of the vehicle on a lower portion of a side surface of the vehicle bonded to each other, and may have the side sill reinforcement unit 30 configured to reinforce the stiffness of the side sill assembly 1 (hereinafter referred to as 'reinforcement unit') provided between the side sill inner 10 and the side sill outer 20.

The side sill inner 10 and the side sill outer 20 may be formed with upper bonding portions 11, 21 and lower bonding portions 12, 22 for bonding to the upper and lower portions, respectively, and may have the intermediate portions formed to be convex in opposite directions to have a space formed therein.

The reinforcement unit 30 may be provided in the space formed between the side sill inner 10 and the side sill outer 20, so that the stiffness of the side sill assembly 1 may be reinforced.

To the present end, the reinforcement unit 30 may include the upper member 31 formed in the longitudinal direction of the vehicle, the lower member 33 formed in the longitudinal direction of the vehicle under the upper member 31, and the intermediate member 32 alternately bonded to the bottom portion of the upper member 31 and the upper surface of the lower member 33.

The upper member 31 may include an upper base 31a formed in the longitudinal direction of the vehicle. The upper base 31a may be formed in a plane form, and formed in the longitudinal direction of the vehicle.

An upper flange portion 31b extending upwards from a width directional inside end portion of the vehicle of the upper base 31a may be formed so that the upper member 31 may be bonded to an inside surface of the side sill inner 10. To bond the upper member 31 to a surface perpendicular to the inside of the side sill inner 10, the upper flange portion 31b may be formed to extend upwards from the width directional inside end portion of the vehicle of the upper base 31a. The upper flange portion 31b may be further formed in the longitudinal direction of the vehicle.

To reinforce the stiffness of the upper member 31, the upper base 31a may be formed with an upper reinforcement bead 31c having a convex cross section. The upper reinforcement bead 31c may be formed in the longitudinal direction of the vehicle. Furthermore, the upper reinforcement bead 31c may be formed on the entire upper base 31a.

The lower member 33 may be formed under the upper member 31 at a predetermined interval from the upper member 31.

The lower member 33 may include a lower base 33a formed in the longitudinal direction of the vehicle. The lower base 33a may be formed in a plane form, and formed in the longitudinal direction of the vehicle.

To bond the lower member 33 to the lower bonding portion 12 of the side sill inner 10, a lower flange portion 33b extending downwardly from the width directional inside end portion of the vehicle of the lower base 33a may be formed. To bond the lower member 33 to the lower bonding portion 12 of the side sill inner 10, the lower flange portion 33b may be formed to extend downwardly from the width directional inside end portion of the vehicle of the lower base 33a The lower flange portion 33b may be further formed in the longitudinal direction of the vehicle.

To reinforce the stiffness of the upper member 31, a lower reinforcement bead 33c having a concave cross section may be formed on the lower base 33a. The lower reinforcement bead 33c may be formed in the longitudinal direction of the vehicle. Furthermore, the lower reinforcement bead 33c may be formed on the entire lower base 33a.

The intermediate member 32 may have the upper surface 32a bonded to the bottom portion of the upper member 31 and the lower surface 32b bonded to the upper surface of the lower member 33 formed alternately. The intermediate member 32 may be bonded by alternately bonding the upper member 31 and the lower member 33 by spot welding between the upper member 31 and the lower member 33, and therefore, the upper member 31, the lower member 32, and the intermediate member 32 form the reinforcement unit 30.

The upper surface 32a and the lower surface 32b of the intermediate member 32 may be connected by a connection surface 32d formed to be inclined. According to such a configuration, the intermediate member 32 may have a W shape when looking at the width direction of the vehicle.

A welding surface 32c bonded to an inclined surface of the inside surface of the side sill inner 10 may be formed on a width directional inside of the vehicle of the lower surface 32b of the intermediate member 32. The welding surface 32c may be bonded to the inclined surface of the inside surface of the side sill inner 10 by welding. The welding surface 32c may be formed to be inclined at a regular angle to have the slope like the inclined surface of the inside surface of the side sill inner 10.

Furthermore, a nut mounting surface 32e on which a lower end portion of a battery mounting nut 34 for mounting the high-voltage battery 40 is located may be formed on the welding surface 32c, and the battery mounting nut 34 may have a lower end portion bonded to the nut mounting surface 32e. The battery mounting nut 34 may be bonded to the welding surface 32c by $CO_2$ welding or projection welding.

The upper base 31a may be formed with a through hole 31c through which the battery mounting nut 34 is provided to penetrate. The outside of the battery mounting nut 34 may be bonded to an inner circumference of the through hole 31c by welding. Therefore, it is possible to not only fix an upper portion of the battery mounting nut 34, but further prevent the upper member 31 from being separated from the intermediate member 32 or the lower member 33. The battery mounting nut 34 may be bonded to the upper base 31a by $CO_2$ welding.

Meanwhile, the lower member 33 may be formed so that the width, that is, the width directional width of the vehicle may be narrower than the width of the intermediate member 32.

The lower member 32 may be formed from the width directional outside end portion of the vehicle of the intermediate member 32 up to a predetermined width. For example, the width of the lower member 33 may be formed from the width directional outside end portion of the vehicle of the lower surface 32b of the intermediate member 32 up to the portion where the welding surface 32c may be formed.

The width of the lower member 33 may be formed at the width of 45% to 55% compared to the width of the intermediate member 32 to have the width of about 50%.

The reinforcement unit 30 may be bonded to the side sill inner 10 in a state where the upper member 31, the intermediate member 32 and the lower member 33 may be bonded to each other to be formed integrally. The upper flange portion 31b of the upper member 31 may be bonded to the surface perpendicular to the inside surface of the side sill inner 10 by welding, and the lower flange portion 33b of the lower member 33 may be bonded to the lower bonding portion 12 of the side sill inner 10 by welding. Thereafter, the side sill outer 20 may be bonded to the outside of the side sill inner 10 to complete the side sill assembly 1.

Figure 3:
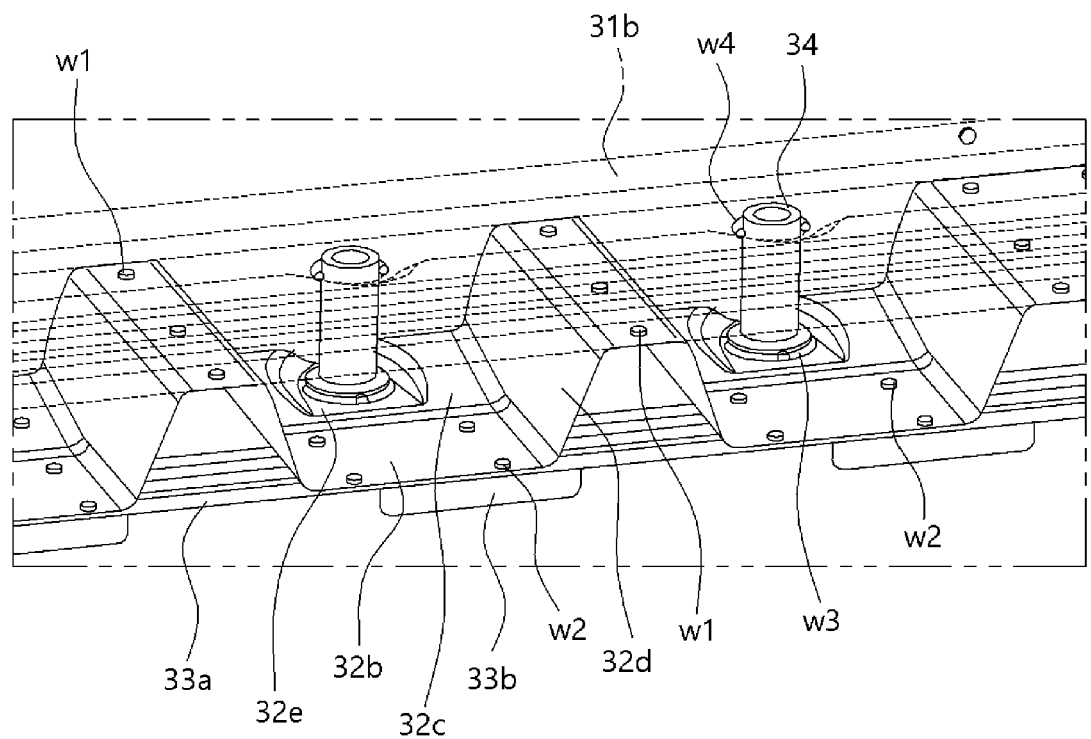
FIG. 3 is an enlarged perspective diagram of major portions of the reinforcement unit of the side sill assembly of the vehicle with reinforced stiffness according to various exemplary embodiments of the present invention.
Figure 4:
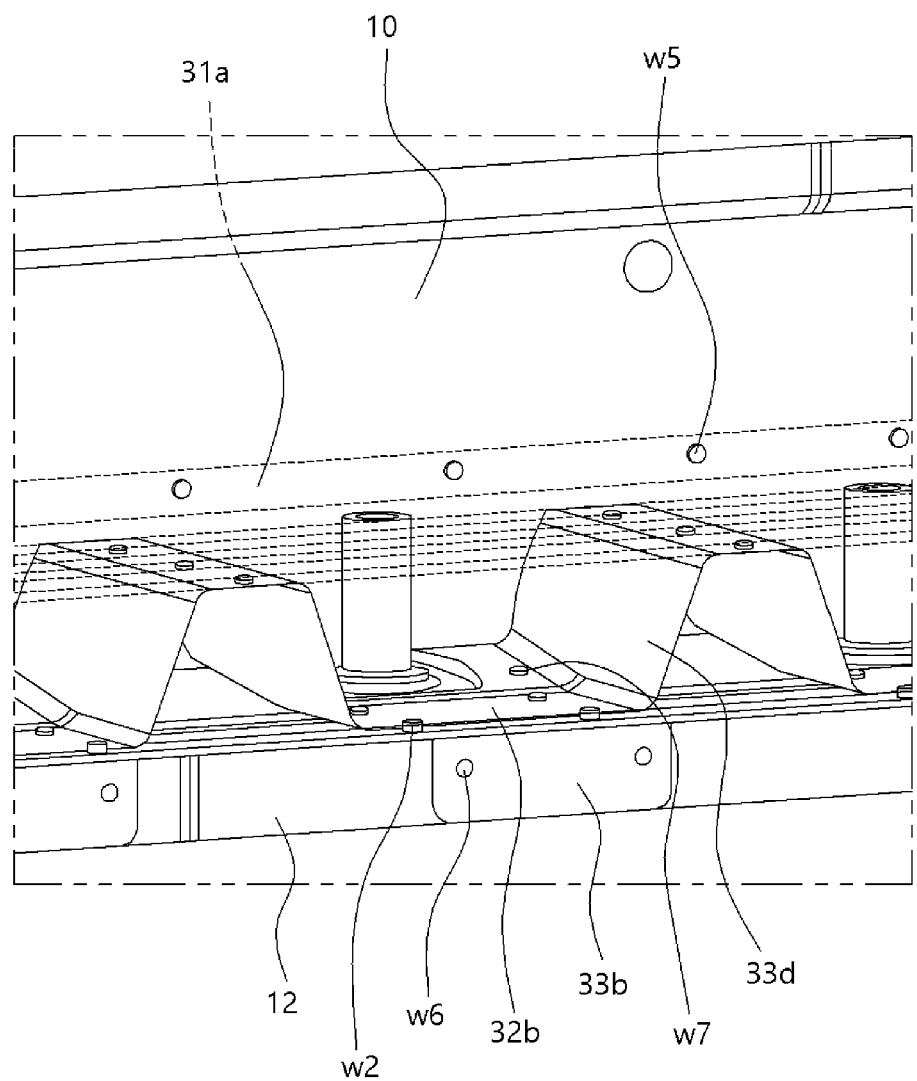
FIG. 4 is a perspective diagram showing a state where the reinforcement unit of the side sill assembly of the vehicle with reinforced stiffness according to various exemplary embodiments of the present invention are bonded to a side sill inner.

FIG. 3 shows the welded portion between the upper member 31, the intermediate member 32, and the lower member 33, and FIG. 4 shows the portion where the intermediate member 32 and the lower member 33 may be welded to the side sill inner 10. The portion where the upper member 31 and the intermediate member 32 may be welded is indicated by 'w1', and the portion where the intermediate member 32 and the lower member 33 may be welded is indicated by 'w2. The portion where the battery mounting nut 34 may be welded to the nut mounting surface 32e of the intermediate member 32 may be indicated by 'w3', and the portion where the battery mounting nut 34 may be bonded to the upper member 31 is indicated by 'w4'. The portion where the upper flange portion 31b of the upper member 31 may be bonded to the surface perpendicular to the inside surface of the side sill inner 10 is indicated by 'w5', the portion where the lower flange portion 33b of the lower member 33 may be bonded to the lower bonding portion 12 of the side sill inner 10 is indicated by 'w6', and the portion where the welding surface 32c of the intermediate member 32 may be bonded to the inclined surface of the inside surface of the side sill inner 10 is indicated by 'w7'.

According to the side sill assembly of the vehicle with reinforced stiffness according to various exemplary embodiments of the present invention having the above configuration, the reinforcement unit 30 may reinforce the stiffness of the side sill assembly 1 against the laterally input load, enhancing stability against the side collision.

Figure 5A:
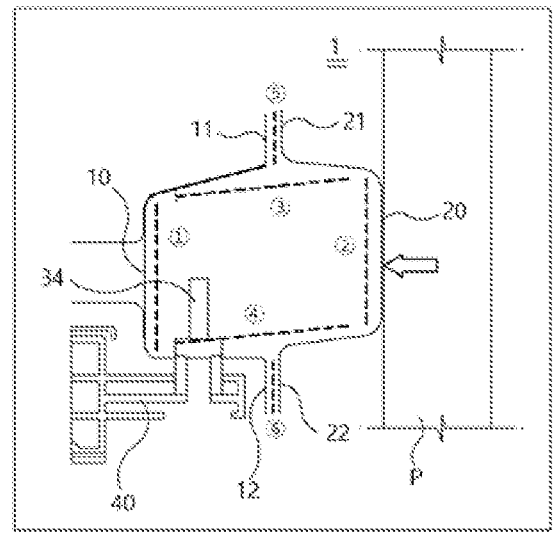
FIG. 5A and FIG. 5B are perspective diagrams showing a state where the reinforcement unit is coupled to a side sill and a high-voltage battery according to the side sill assembly of the vehicle with reinforced stiffness according to various exemplary embodiments of the present invention.
Figure 5B:
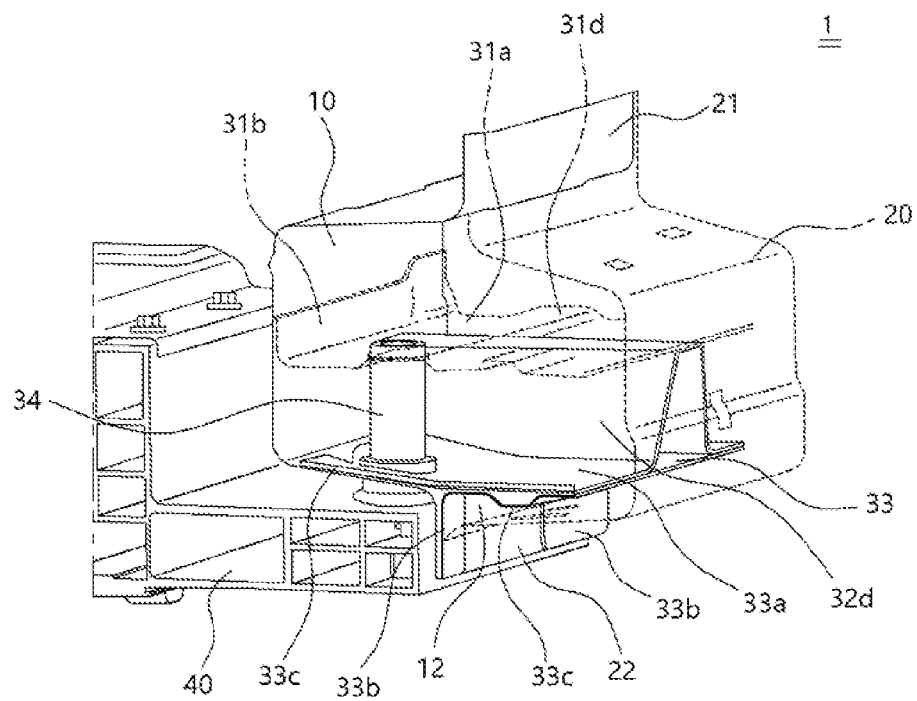

The side sill assembly 1 including the side sill inner 10 and the side sill outer 20 may have surfaces indicated by ① to ⑥ of FIG. 5A. In other words, in the event of the side collision, the side sill assembly 1 may have surfaces (①, ②) directly forming sidewalls, surfaces (③, ④) connecting the sidewalls, and surfaces (⑤, ⑥) assembling the inside and outside of the side sill with parts. Here, as in a case where the side surface of the vehicle and a utility pole (P) collide, to improve the side collision performance, it is good to directly connect the surfaces (①, ②), and if impossible, the surfaces (③, ④) should be connected. However, the conventional aluminum extruded structure and steel press welding structure have the structure of connecting only the surfaces (⑤, ⑥).

However, as the reinforcement unit 30 is applied, the surface (①) may be bonded to the upper flange portion 31b of the upper member 31, the surface (④) may be bonded to the welding surface 32c of the intermediate member 32, and the surface (⑥) may be bonded to the lower flange portion 33b of the lower member 33. The present invention may have the same the number of matched surfaces as that of the conventional steel press welding structure, but restricts the surface (①) that exerts the largest resistance against the side collision, improving the side collision performance.

Furthermore, it is possible to achieve the lightweight structure and the improved stiffness using the steel which is a relatively inexpensive material.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A side sill assembly of a vehicle with reinforced stiffness, the side sill assembly comprising:
    a side sill inner, a side sill outer, and a reinforcement unit provided between the side sill inner and the side sill outer,
    wherein the reinforcement unit includes:
        an upper member provided in a longitudinal direction of the vehicle;
        a lower member provided in the longitudinal direction of the vehicle, and located to be spaced from the upper member under the upper member; and
        an intermediate member having an upper surface bonded to a bottom portion of the upper member and a lower surface bonded to an upper surface of the lower member alternately formed thereon, and
    wherein the lower member is formed so that a width of the lower member in a width direction of the vehicle is narrower than a width of the intermediate member.

2. The side sill assembly of claim 1,
    wherein the side sill inner is formed with a first upper bonding portion and a first lower bonding portion, and the side sill outer is formed with a second upper bonding portion facing the first upper bonding portion and a second lower bonding portion facing the first lower bonding portion, and
    wherein the side sill inner and the side sill outer include intermediate portions formed to be convex in opposite directions to have a space therebetween, and
    wherein the reinforcement unit is provided in the space formed between the side sill inner and the side sill outer.

3. The side sill assembly of claim 1, wherein the upper and lower surfaces of the intermediate member are connected by a connection surface.

4. The side sill assembly of claim 3, wherein the connection surface is formed to be inclined with an acute angle with respect to the longitudinal direction.

5. The side sill assembly of claim 1, wherein the upper member includes:
    an upper base formed in the longitudinal direction of the vehicle; and
    an upper flange portion formed to extend upwards from the upper base to be bonded to an inside surface of the side sill inner.

6. The side sill assembly of claim 5, wherein an upper reinforcement bead having a convex cross section is formed on the upper base in the longitudinal direction of the vehicle.

7. The side sill assembly of claim 1, wherein the lower member includes:
    a lower base formed in the longitudinal direction of the vehicle; and
    a lower flange portion formed to extend downwardly from the lower base to be bonded to a lower bonding portion of the side sill inner.

8. The side sill assembly of claim 7, wherein a lower reinforcement bead having a concave cross section is formed on the lower base in the longitudinal direction of the vehicle.

9. The side sill assembly of claim 1, wherein the lower member is formed from a width directional outside end portion of the vehicle of the intermediate member up to a predetermined width.

10. The side sill assembly of claim 1, wherein a width of the lower member is formed at 45% to 55% of the width of the intermediate member.

11. The side sill assembly of claim 1, wherein the intermediate member is bonded to the upper member and the lower member by spot welding.

12. The side sill assembly of claim 1, wherein a width directional interior of the vehicle of the lower surface of the intermediate member is a welding surface bonded to an inclined surface of an inside surface of the side sill inner.

13. The side sill assembly of claim 12,
    wherein a nut mounting surface on which a lower end portion of a battery mounting nut configured to mount a battery is located is formed on the welding surface, and
    wherein the battery mounting nut has a lower end portion bonded to the nut mounting surface.

14. The side sill assembly of claim 13, wherein the lower end portion of the battery mounting nut is bonded to the nut mounting surface by CO2 welding or projection welding.

15. The side sill assembly of claim 14,
    wherein a through hole through which the battery mounting nut is provided to penetrate is formed in an upper base of the upper member, and
    wherein an outside circumference of the battery mounting nut is bonded to an inside circumference of the through hole.

16. The side sill assembly of claim 15, wherein the outside circumference of the battery mounting nut and the inside circumference of the through hole are bonded by $CO_2$ welding.

17. The side sill assembly of claim 12, wherein a width of the lower member is ranged from a width directional outside end portion of the vehicle of the lower surface up to a portion where the welding surface is formed.

\* \* \* \* \*